United States Patent
Meckstroth et al.

(10) Patent No.: US 6,863,631 B2
(45) Date of Patent: Mar. 8, 2005

(54) UNIDIRECTIONAL MOTION ASYMMETRIC DAMPED TENSIONER

(75) Inventors: Richard J. Meckstroth, Vonore, TN (US); William K. Bowman, Springfield, MO (US); Kevin G. Dutil, Springfield, MO (US); Steven J. Eck, Springfield, MO (US); Earl E. McShane, Springfield, MO (US)

(73) Assignee: Dayco Products, LLC, Miamisburg, OH (US)

( * ) Notice: Subject to any disclaimer, the term of this patent is extended or adjusted under 35 U.S.C. 154(b) by 0 days.

(21) Appl. No.: 10/029,440

(22) Filed: Dec. 20, 2001

(65) Prior Publication Data

US 2003/0119615 A1 Jun. 26, 2003

(51) Int. Cl.[7] .................................. F16H 7/12
(52) U.S. Cl. ......................................... 474/135
(58) Field of Search ................ 474/135, 109, 474/110, 133, 136, 138

(56) References Cited

U.S. PATENT DOCUMENTS

| | | | |
|---|---|---|---|
| 4,270,906 A | * 6/1981 | Kraft et al. | 474/135 |
| 4,464,147 A | 8/1984 | Foster | |
| 4,557,709 A | 12/1985 | St. John | |
| 4,596,538 A | 6/1986 | Henderson | 474/135 |
| 4,808,148 A | * 2/1989 | Holtz | 474/112 |
| 4,822,322 A | 4/1989 | Martin et al. | 474/135 |
| 4,826,471 A | * 5/1989 | Ushio | 474/135 |
| 4,832,666 A | * 5/1989 | Henderson | 474/135 |
| 4,886,482 A | 12/1989 | Koschmieder et al. | |
| 4,886,483 A | * 12/1989 | Henderson | 474/135 |
| 4,938,734 A | 7/1990 | Green et al. | 474/135 |
| 4,983,145 A | 1/1991 | Hirai et al. | |
| 5,030,172 A | 7/1991 | Green et al. | 474/135 |
| 5,035,679 A | 7/1991 | Green et al. | 474/135 |
| 5,171,188 A | 12/1992 | Lardrot | 474/133 |
| 5,190,502 A | 3/1993 | Gardner et al. | 474/135 |
| 5,328,415 A | * 7/1994 | Furutani et al. | 474/112 |
| 5,348,514 A | 9/1994 | Foley | 474/135 |
| 5,354,242 A | 10/1994 | St. John | 474/135 |
| 5,399,124 A | * 3/1995 | Yamamoto et al. | 474/94 |
| 5,443,424 A | 8/1995 | Henderson | 474/135 |
| 5,470,280 A | * 11/1995 | Ayukawa | 474/135 |
| 5,545,095 A | 8/1996 | Henderson | |
| 5,718,649 A | 2/1998 | Hong et al. | |
| 5,924,947 A | 7/1999 | Williams | 474/133 |
| 5,935,032 A | 8/1999 | Bral | 474/117 |
| 6,231,465 B1 | * 5/2001 | Quintus | 474/133 |
| 6,497,632 B2 | * 12/2002 | Ayukawa et al. | 474/135 |

FOREIGN PATENT DOCUMENTS

| | | | | |
|---|---|---|---|---|
| FR | 1439272 | * | 4/1965 | |
| GB | 462044 | * | 5/1935 | |
| JP | 05332409 A | * | 12/1993 | F16H/7/12 |
| JP | 06137390 A | * | 5/1994 | F16H/7/12 |
| JP | 06213296 A | * | 8/1994 | F16H/7/12 |

* cited by examiner

*Primary Examiner*—Marcus Charles
(74) *Attorney, Agent, or Firm*—Joseph V. Tassone; Thompson Hine LLP

(57) ABSTRACT

A belt tensioner for a power transmission belt is provided that operates on an endless path and that utilizes asymmetric motion control. The belt tensioner has an arm with a belt engaging section and a drum section, a support member for securing the tensioner relative to the belt, where the arm pivots about the support member, and a tension spring that urges the arm to pivot about the support member in a first direction and urges the belt engaging section against the belt with a force to tension the belt. The tensioner also has a stator inside the drum section utilized to form arcuate spaces circumferentially spaced around the stator between the stator and the drum section and arcuate shaped wedges in the arcuate spaces.

17 Claims, 3 Drawing Sheets

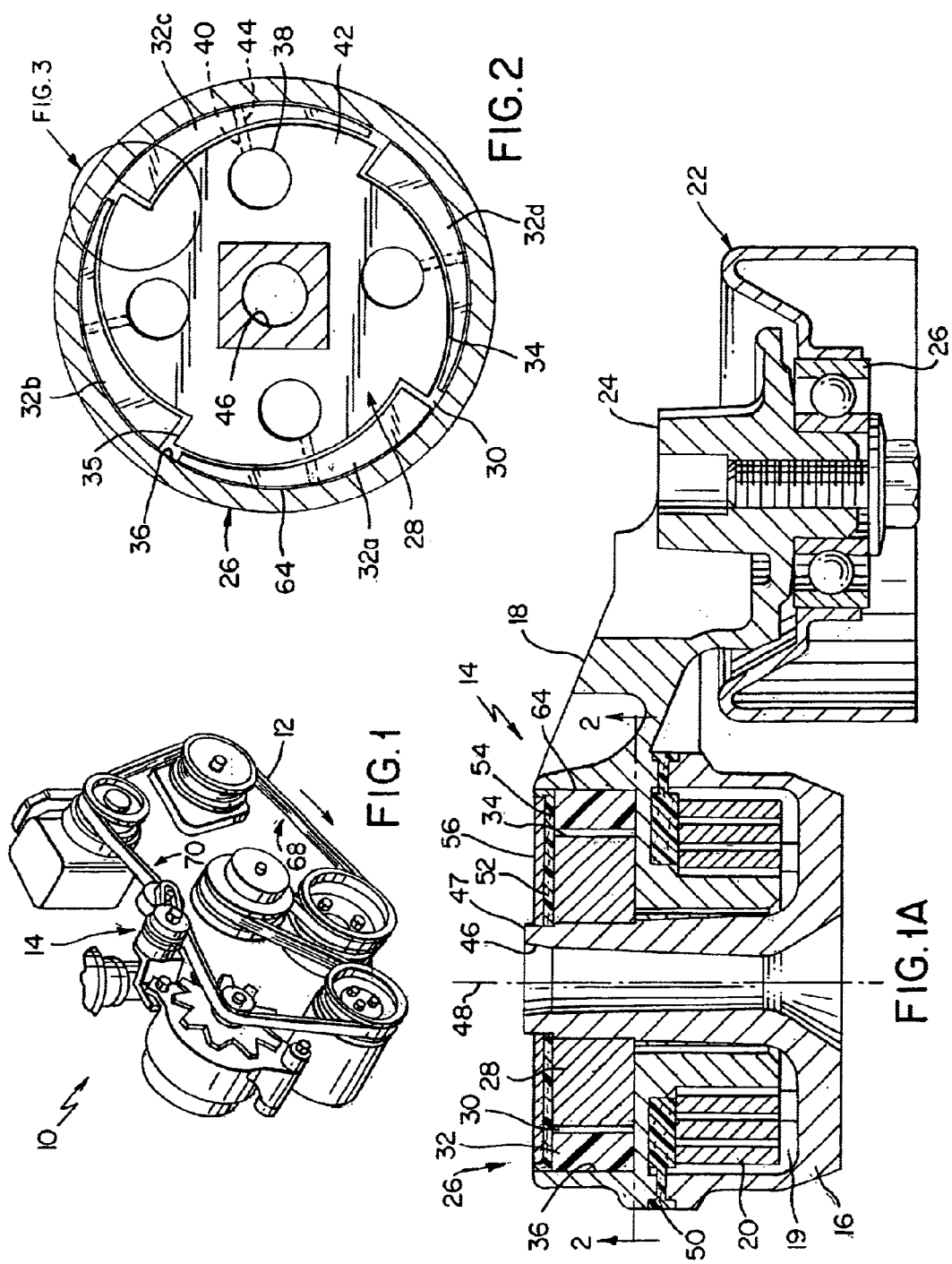

UNIDIRECTIONAL MOTION ASYMMETRIC DAMPED TENSIONER

RELATED APPLICATION

Filed concurrently with this application is U.S. Ser. No. 10/029,442 to Meckstroth et. al. entitled "Dual Friction Surface Asymmetric Damped Tensioner."

FIELD OF THE EMBODIMENTS

This embodiments relate to a new method and apparatus for a belt tensioner.

BACKGROUND

Many automobile engines currently on the market utilize an endless power transmission belt for driving a plurality of driven accessories. They employ a tensioning system utilized to provide a tensioning force on the endless power transmission belt, which may be of any suitable type known in the art. Preferably, the belt is made primarily of a polymeric, Kevlar or Aramid material because the unique features of the tensioner of this invention readily permit the tensioner to tension a belt having a polyester load-carrying cord in an efficient manner.

In many of these automotive accessory drives it is necessary to provide a correct tension to control a tension ratio throughout the life of the belt. With the advent of the single belt V-ribbed drive system, this is of increasing importance since belts are longer and some accessories are driven off the backside of the belt as a flat belt drive. Automatic tensioners of various descriptions have been developed having the requisite characteristics enabling them to tune the belt system to remove input torsionals and prevent or reduce harmonics, while allowing the tensioner to respond to changes in the belt tension requirements. For instance, see U.S. Pat. Nos. 4,596,538, 4,832,666, and 5,443,424 to Henderson, U.S. Pat. Nos. 4,938,734, 5,030,172 and 5,035,679 to Green, et. al., U.S. Pat. No. 5,190,502 to Gardner, et. al., or U.S. Pat. No. 5,348,514 to Foley, all now incorporated into this application by this reference thereto. A problem is that a torsion spring cannot be made that will apply a different torsion depending on motion direction, to both resiliently tension a belt and prevent bubble or slack length from developing in the belt during periods of extreme engine deceleration. It is this limitation that creates the need for asymmetric damping.

For optimal function of a V-ribbed, flat belt, or V belt tensioner, it is desirable that the tensioner moves easily and quickly toward the belt to take up slack (spring unwind direction), but provide more than the same resistance to a belt lifting of the tensioner away from the belt (spring windup direction). This feature is desirable for proper control of steady state accessory torque loads that are occasionally interrupted with a non-steady state or reverse transient load, such as a wide-open-throttle (WOT) one-two gear shift in manual and automatic transmission. During WOT, the engine suddenly goes from, for example, 5000 RPM to 3500 RPM, which is similar to putting a brake on the engine. The tensioner then becomes an untensioner, which can cause tensioner lock-up and belt slip, because the tensioner cannot sufficiently react to the high transient tension.

Also, allowing the tensioner to move easily and quickly toward the belt to take up slack (spring unwind direction), but providing more than the same resistance to a belt lifting of the tensioner away from the belt (spring windup direction) is desirable to control engine start up transients to slow combustion events and rapid engine acceleration during first firing. Further, this motion is desirable to control torque pulses of engines having lightweight flywheels or "dual mass" flywheels, where the combustion torque variation can approach levels equal to the average accessory torque load at idle at the crankshaft driver pulley.

It is known to have asymmetric motion control using hydraulic linkage with directional fluid orifices, for instance see U.S. Pat. No. 5,924,947 to Williams and U.S. Pat. No. 4,822,322 to Martin et. al. Such manipulation of fluid requires expensive and failure-prone dynamic seals and valves.

It is also known to have asymmetric motion control using dry or lubricated surface friction, such as a brake band, which is limited in its ability to provide asymmetric motion by the amount of angular vector shift with a change in rotational direction and that requires excessive rotational motion to tighten the band in the high torque direction, for instance see U.S. Pat. No. 5,354,242 to St. John.

It is also known to have asymmetric motion control using damping friction surfaces that are limited in friction torque developed by the amount of normal load that can be generated by a spring and that need lots of angular displacement to engage and disengage, where the displacement is amplified by a conical wedging action, for instance see U.S. Pat. No. 5,935,032 to Bral.

It is also known to have asymmetric motion control using an "elastomer sandwich" that is severely limited in range of operation by the very steep spring rates of the compressed elastomers and the tensioner suffers from a lack of angular rigidity since its center of pivot floats, and thus is not absolutely controlled, for instance see U.S. Pat. No. 5,171,188 to Lardrot.

The present invention overcomes these deficiencies and accomplishes the above-discussed functions for asymmetric motion control, and can be applied to any conventional rotating tensioner that uses a rotational spring to rotate the tensioner arm toward the belt to create belt tension.

SUMMARY

One manifestation provides a belt tensioner that utilizes asymmetric motion control for a power transmission belt that operates on an endless path. The tensioner has an arm with a belt engaging section and a drum section, a support member for securing the tensioner relative to the belt, where the arm pivots about the support member, and a tension spring that urges the arm to pivot about the support member in a first direction and urges the belt engaging section against the belt with a force to tension the belt. The tensioner also has a stator inside the drum section utilized to form arcuate spaces circumferentially spaced around the stator between the stator and the drum section and arcuate shaped wedges in the arcuate spaces.

An aspect is to provide a housing for the spring in the tensioner.

Another aspect is to provide a wedge spring to couple each one of the wedges to the stator.

Another aspect is to provide a compliant member to coupled a first end of each of the wedges to a second end of an adjacent one of each of the wedges.

Another aspect is to provide a hub on the support member about which the arm pivots.

Another aspect is to provide a new method for utilizing a belt tensioner, the method of having one or more of the novel features as set forth above or hereinafter shown or described.

Other objects, uses, and advantages are apparent from a reading of this description, which proceeds with references to the accompanying drawings form a part thereof and wherein:

BRIEF DESCRIPTION OF THE DRAWING

FIG. 1 is a perspective view of an automobile engine that utilizes the new belt tensioner.

FIG. 1a is a section view of the tensioner.

FIG. 2 is a section view looking into the tensioner at line 2—2 in FIG. 1a.

DESCRIPTION OF THE PREFERRED EMBODIMENTS

Figure 3:
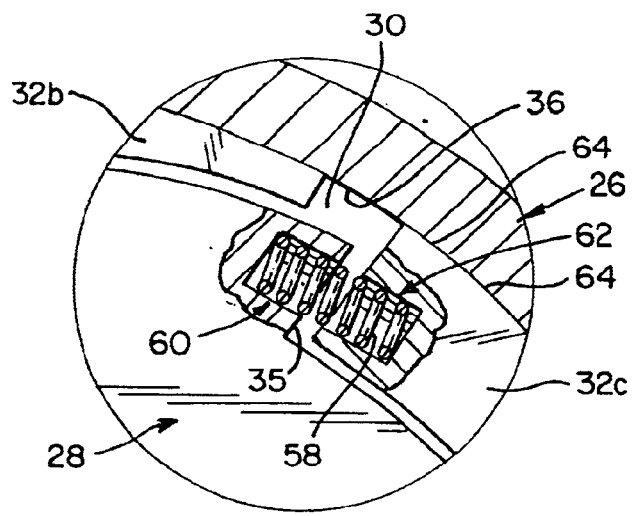
FIG. 3 is a zoomed view of a section of the tensioner as circled in FIG. 2 according to an embodiment.

While the various features are hereinafter illustrated and described as providing a belt tensioner for a particular power transmission belt of a particular motor vehicle engine, it is to be understood that the various features can be utilized singly or in any combination thereof to provide a belt tensioner for other arrangements as desired. Therefore, the embodiments are not to be limited to only the embodiments illustrated in the drawings, because the drawings are merely utilized to illustrate one of the wide variety of uses.

Referring now to FIG. 1, an automobile engine is generally indicated by reference numeral 10 and utilizes an endless power transmission belt 12 for driving a plurality of driven accessories, as is well known in the art. The new belt tensioner is generally indicated by reference numeral 14 and is utilized to provide a predetermined tensioning force on the belt 12 in a manner hereinafter set forth. The endless power transmission belt 12 may be of any suitable type known in the art. The belt 12 may be made primarily of polymeric material because the unique features of the tensioner 14 readily permit the tensioner 14 to tension a belt having a load carrying cord in an effective manner as fully set forth in the aforementioned patent to Henderson, U.S. Pat. No. 4,596,538 whereby this U.S. Patent is being incorporated into this disclosure by reference.

As best illustrated in FIG. 1a, the new belt tensioner 14 comprises a support member 16 formed of any suitable polymeric material, which is configured to be fixed to a mounting bracket or support structure of the engine 10 by any known fastening devices extending through suitable apertures in the support member 16 as fully set forth in the aforementioned patent to Henderson, U.S. Pat. No. 5,443,424 whereby this U.S. Patent is being incorporated into this disclosure by reference. A belt engaging arm 18 is moveably carried by the support member 16 in a manner hereinafter set forth, and may be die cast of any suitable metallic material, such as aluminum material.

The tensioner 14 further includes a housing 19 that houses a spring 20, where the spring 20 has an outer end that is operatively interconnected to the support member 16 and an inner end that is operatively interconnected to the belt engaging arm 18. The spring 20 comprises a substantially flat, metallic member wound in a spiral manner to define spirals or coils, where an inner spiral is adjacent the inner end and an outer spiral is adjacent the outer end. The spring 20 has been wound up in such a manner that when it is disposed in the tensioner 14, the spring 20 urges a belt engaging pulley 22 of the belt engaging arm 18 against the belt 12 to tension the same with a predetermined tension in a manner fully set forth in the above-mentioned patents. Although, a spiral flat cross section spring may be used because it takes up less space in the tensioner, as is know in the art any spring may be utilized, such as a helical coil round cross-section, compression, or tension linear spring that, while less expensive, take up more room in the housing 19 because they have a longer barrel. The belt engaging pulley 22 is rotatably mounted to an end 24 of the arm 18 by suitable bearings 26 in a manner well known in the art.

Figure 4:
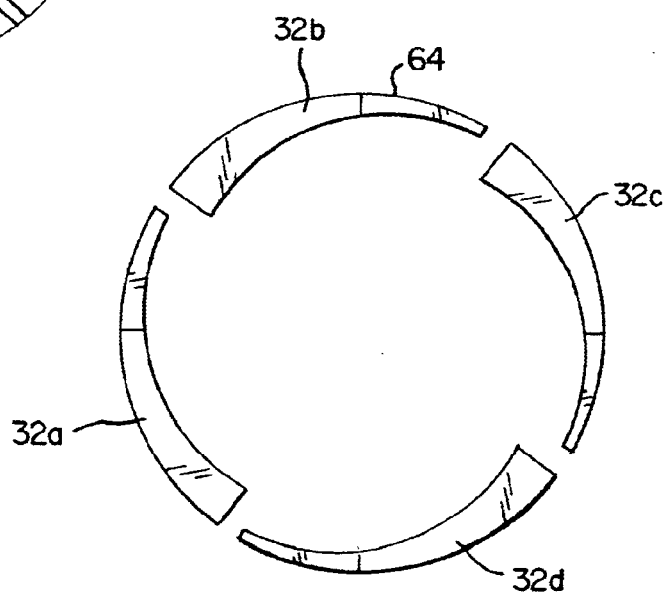
FIG. 4 is a top view of wedges of the tensioner as shown in FIGS. 1a and 2.

Referencing FIGS. 2 and 4, with continuing reference to FIG. 1a, the belt engaging arm 18 also includes a drum section 26, which forms a cavity with the support 16. Within the cavity is a stator 28, a wedge pocket 30, and wedges 32a–d. The stator 28 includes an arcuate, stepped outside surface 34, which forms the wedge pockets 30 as arcuate spaces between the outside surface 34 and an inside surface 36 of the drum section 26. The stator 28 may be made of steel or reinforced plastic, where the outside surface 34 of the stator 28 includes circumferentially spaced, radially inset steps 35. The wedges 32 are located within these arcuate spaces or wedge pockets, where the wedges 32 are circumferentially limited in travel by the arcuate spaces or wedge pockets in which they reside. Lubricating passages 38 run through the stator 28, lubricating passages 40 run adjacent an end surface 42 of the stator 28, and lubricating passages 44 run through wedges 32. These lubricating passages 38, 40, and 44 are used to slow funnel lubrication to the wedge pocket 30, which is configured as a ball joint, to allow for maintenance free operation. The stator 28 also has a elongated hole 46, centrally aligned along a longitudinal axis 48 of the tensioner 14, through which a hub 47 of the support member 16 is passed, such that the stator 28 is non-moveably secured to the hub 47. Also, the arm 18 pivots around the hub 47.

The wedges 32 may be arcuate wedges, where the slope may be around 7–8 degrees, such that if the coefficient of friction is greater than around 0.126 the tensioner 14 will lock up or engage, as described in more detail below, due to friction generated by a wedge action. Lock-up occurs when no parts move against each other during the wedging action described below, which increases the available torque of the tensioner 14 against the force from the belt 12 on the tensioner 14. This lock-up precludes further motion of the tensioner 14 away from the belt 12. Engaging occurs when there is some slippage because the force of friction between the parts is lower than the force on the parts, i.e., the wedging action is not in absolute lock-up and some slipping occurs between parts. Also, the wedges 32 may be made of reinforced plastic, thermoset phenolic, or brake pad organic thermoset material. It is to be appreciated that more or less than four wedges 32 may be used and all alternative arrangements fall within the scope of the embodiments.

Again with reference to FIGS. 1a, 2, and 4, the tensioner further includes a first bearing 50 that is located in the drum section 26 adjacent the spring 20. Also, a second bearing 52 is located between the support member 16 and the drum section 26 adjacent the end surface 42 of the stator 28 and an end surface 54 of the wedges 32. Finally, the tensioner includes a retaining plate 56 that is located between the support member 16 and the drum section 26 adjacent the second bearing 52. The bearings 50 and 52 may be manufactured from high grade nylon with reinforcement for compressive and shear strength, and microscopic porosity to retain grease, as manufactured by DuPont and Dow.

Now with reference to FIG. 3, a coupler 58 according to an embodiment is shown. The coupler 58 is positioned in an opening 60 of the stator 28 and an opening 62 of the wedge 32c, where all the wedges 32 have a similar opening and coupling to the stator 28. The coupler 58 may be configured as a wedge spring. There are several purposes for utilizing the web springs 58. First, the wedge springs 58 press the wedges 32 lightly against the arm inside surface 36, thereby achieving the proper wedge function by making the wedges 32 sensitive to arm rotation direction. Second, this outward pressure of the wedge spring 58 not only assures function, but also achieves a high level of responsiveness by having the wedge surfaces 64 already engaged, where the wedge surface 64 must engage during the high torque spring windup direction. This reduces the amount of rotational deflection that must occur during a transient belt event for the high tensioner resistance to occur. Third, as wear occurs on the wedge friction elements, the wedge springs 58 compensate by acting as automatic wear compensators.

Figure 5:
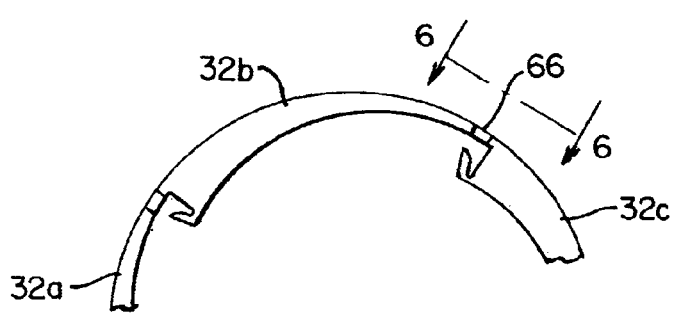
FIG. 5 is a top view of a section of the wedges of the tensioner according to an embodiment.
Figure 6:
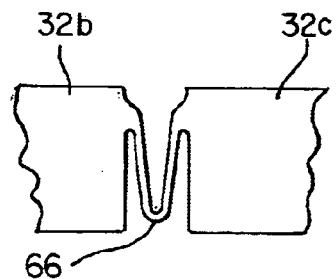
FIG. 6 is a section view looking into the wedges at line 6—6 in FIG. 5.

Turning now to FIG. 5, a coupler 66 according to another embodiment is shown. The coupler 66 may be an integral compliant member of the wedges 32. This coupler 66 acts in a similar way as the spring 58. First, the couplers 55 press the wedges 32 lightly against the arm inside surface 36, thereby achieving the proper wedge function by making the wedges 32 sensitive to arm rotation direction. Second, this outward pressure of the couplers 66 not only assures function, but also achieves a high level of responsiveness by having the wedge surfaces 64 already engaged, where the wedge surfaces 64 must engage for the high torque spring windup direction. This reduces the amount of rotational deflection that must occur during a transient belt event for the high tensioner resistance to occur. Third, as wear occurs on the wedge friction elements, these springs 58 compensate by acting as automatic wear compensators. Other couplers as shown and described in co-pending application U.S. Ser. No. 10/029,442 to Meckstroth et. al. discussed above that is hereby incorporated by reference.

Figure 7A:
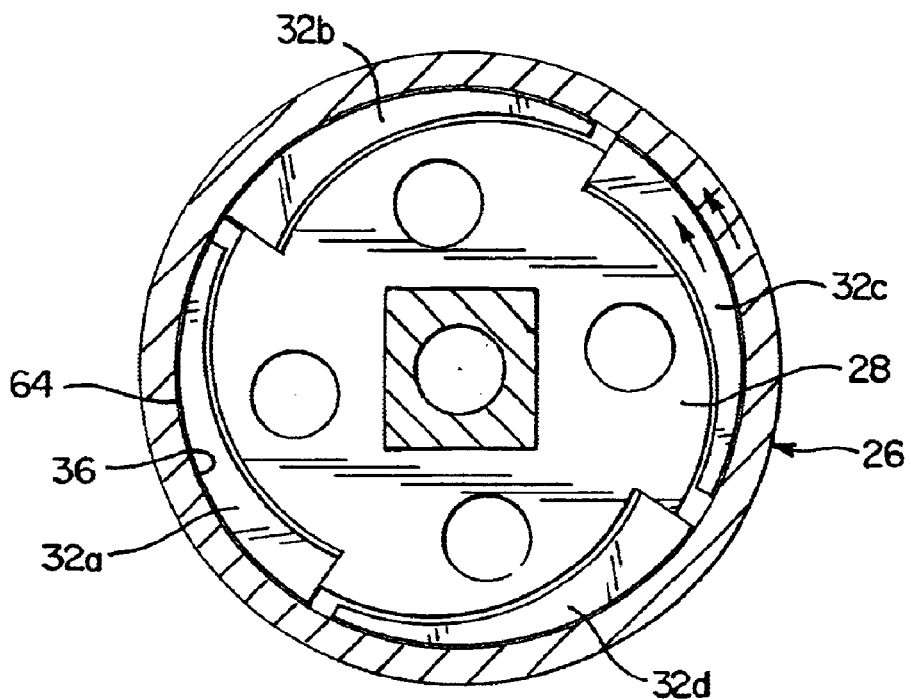
FIG. 7A is a section view of the tensioner during a steady state operation.

As seen in FIG. 7A, during a first operation state, maybe steady state, the tensioner arm 18 rotates in a first direction towards the belt, maybe the spring unwinding direction or clockwise direction. Also during this first operation state, the wedges 32 lightly drag on and move with the inside surface 36 the drum section 26, but they do not engage because there is an air gap between the stator 28 and the wedges 32. The wedges 32 do not engage because in this direction there is only light friction between the surface 64 of the wedges 32 and the surface 36 of the drum section 26. Thus, this is a disengaging direction. During the first state, a tension between the belt 12 and the tensioner 14 is preferably around 80 PSI.

Figure 7B:
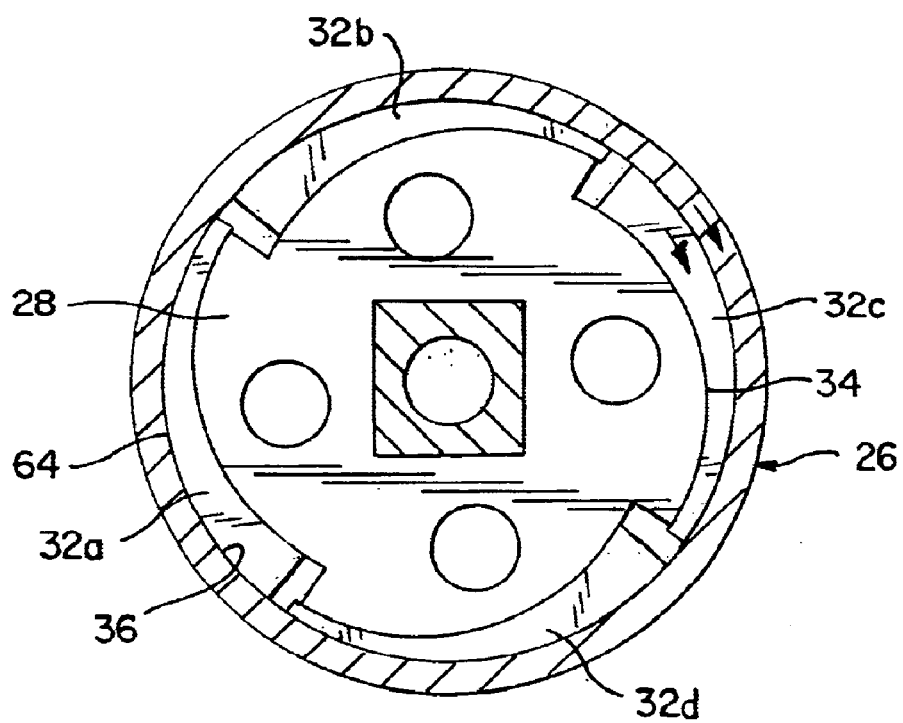
FIG. 7B is a section view of the tensioner during a non-steady state operation.

In contrast, as seen in FIG. 7B when the arm 18 travels in an opposite, second direction, which may be a spring windup or counter clockwise direction, a dynamic event occurs that is trying to lift the tensioner 14 with the belt 12. Thus may be a second operation state, or non-steady state, where a reverse tension between the belt 12 and the tensioner 14 can reach 300 PSI. This event can be the unloading of an accessory, producing more tension in a slack span 68 (FIG. 1), or a rapid engine deceleration, which causes the inertia of one or more accessories to pull against an engine driver pulley through the belt 12 at a tensioner belt span 70 (FIG. 1). During this event, it is desirable for the tensioner 14 to resist this motion with a greater torque than is normally provided by the spring 20. Therefore, the surface 64 of the wedges 32 move with and frictionally engage between the surface 36 of the drum section 26 and the surface 34 of the stator 28, which produces a large enough torque to maintain a constant, predetermined tension on the belt 12. The springs 58 or the compliant members 66 assist in speeding up an engaging or lockup time. As soon as the dynamic event is over, the torque of the spring 20 generates sufficient motion of the arm 18 in the spring unwind direction to unlock or disengage the wedges 32.

The tensioner is unidirectional because the rotational motion of the wedges 32 is counter clockwise only. Also, the asymmetrical damping is accomplished through the present invention to allow the friction damping to be higher when the belt 12 tries to lift the tensioner 14 than when the tensioner 14 moves with the belt 12. Essentially, there is no damping when the tensioner 14 moves toward the belt 12. It is to be appreciated that the spring windup direction may be either clockwise or counterclockwise, as can be the spring unwinding direction. This would be accomplished by using a mirror image tensioner. Also, these principals and mechanisms can be applied to either dry friction elements or wet friction elements. Wet friction should result in more durability, similar to wet friction being used in automatic transmissions.

Another manifestation includes a method of utilizing a tensioner for maintaining a predetermined tension on a power transmission belt to be operated on an endless path. The method comprises a first step of providing an arm comprising a belt engaging section and a drum section. A second step of the method provides a support member configured to be secured relative to the belt, the support member comprising a hub having a longitudinal axis and being fixed from movement relative to the belt engaging section, the hub moveably holding the arm. A third step of the method provides a spring operatively interconnected to the arm and the support member, the spring being configured to urge the belt engaging section relative to the support member and against the belt with a force to provide the predetermined tension on the belt. A fourth step of the method comprises providing a stator held by the hub, the stator being positioned relative to an inside surface of the drum section to form arcuate spaces between the outside surface or the stator and the inside surface of the drum section, and arcuate shaped wedges positioned in the arcuate spaces.

During a first operating state of the method, the arm and wedges move in a first direction, the wedges are disengaged from the stator and the arm, and the spring maintains the belt, via the belt engaging section, at the predetermined tension. Then, during a second operating state of the method of the present invention, the arm and wedges moves in a second direction, as indicated by the arrows in FIG. 7B, to engaged the stator, wherein an increased amount of torque is created through the engagement so that the wedges in conjunction with the spring maintain the belt, via the belt engaging section, at the predetermined tension.

The embodiments have been described in detail with respect to specific embodiments thereof, but it will be apparent that numerous variations and modifications are possible without departing from the spirit and scope of the embodiments as defined by the following claims.

What is claimed:

1. A tensioner for a power transmission belt that operates on an endless path and that utilizes asymmetric motion control, the tensioner comprising:
   an arm comprising a belt engaging section and a drum section;
   a support member for securing the tensioner relative to the belt, the arm pivoting about the support member;
   a spring that urges the arm to pivot about the support member in a first direction and urges the belt engaging section against the belt with a force to tension the belt, wherein the spring is a flat, spiral wound spring and wherein the support member comprises a housing for the spring;
   a stator inside the drum section of the arm forming arcuate spaces, the arcuate spaces being circumferentially spaced around the stator between the stator and the drum section; and
   arcuate shaped wedges located in the arcuate spaces, wherein the spring resists the tension force of the belt via the belt engaging section with a first force during a first operating state, and the spring and the wedges resist the tension force of the belt with a second force that is greater than the first force during a second operating state.

2. The tensioner of claim 1, wherein a wedge spring operatively couples each of the arcuate wedges to the stator.

3. The tensioner of claim 1, further comprising fluid passageways in the stator and the wedges.

4. The tensioner of claim 1, wherein the support member comprises a hub about which the arm pivots.

5. The tensioner of claim 1, wherein the stator includes a plurality of circumferentially spaced, radially inset steps.

6. The tensioner of claim 1, wherein the belt engaging section includes a pulley.

7. The tensioner of claim 1, wherein the wedges are made from at least one of reinforced plastic, thermoset phenolic, and brake pad organic thermoset material.

8. The tensioner of claim 1, wherein a coefficient of friction of an outside surface of the wedges is at or above 0.126.

9. The tensioner of claim 1, further comprising springs, each of the springs being coupled at one end in a cavity of one of the wedges and at an opposite end in a cavity of the stator.

10. The tensioner of claim 1, wherein the arcuate shaped wedges are inclined and include a wide end and a narrow end and are oriented with the wide end located in a direction opposite the first direction from the narrow end.

11. The tensioner of claim 1, wherein a first end of each of the wedges is coupled to a second end of an adjacent one of the wedges via a compliant section.

12. A method of utilizing a tensioner for maintaining a predetermined tension on a power transmission belt to be operated on an endless path, the method comprising the steps of:
   providing an arm comprising a belt engaging section and a drum section;
   providing a support member configured to be secured relative to the belt, the support member comprising a hub having a longitudinal axis and being fixed from movement relative to the belt engaging section, the hub moveably holding the arm;
   providing a spring operatively interconnected to the arm and the support member, the spring being configured to urge the belt engaging section relative to the support member and against the belt with a force to provide the predetermined tension on the belt;
   providing a stator held by the hub, the stator being positioned relative to an inside surface of the drum section to form arcuate spaces between the outside surface of the stator and the inside surface of the drum section; and
   providing arcuate shaped wedges positioned in the arcuate spaces.

13. The method of claim 12, further comprising the step of coupling the wedges to the stator via a spring.

14. The method of claim 12, further comprising the step of coupling the wedges together.

15. The method of claim 12, wherein:
   during a first operating state of the system, the arm and wedges move in a first direction, the wedges are disengaged from the stator and the arm, and the spring maintains the belt, via the belt engaging section, at the predetermined tension; and
   during a second operating state of the system, the arm and wedges moves in a second direction to engaged the stator, wherein an increased amount of torque is created through the engagement so that the wedges in conjunction with the spring maintain the belt, via the belt engaging section, at the predetermined tension.

16. A tensioner for a power transmission belt that operates on an endless path, the tensioner comprising an arm including a belt engaging section and a drum section, a support member securing the tensioner relative to the belt, the support member comprising a hub having a longitudinal axis and being fixed from movement relative to the belt engaging section, the hub moveably holding the arm, a spring operatively interconnected to the arm and the support member, the spring being configured to urge the belt engaging section relative to the support member and against the belt with a force to tension the belt, the improvement wherein the tensioner further comprises:
   a stator held by the hub, the stator being positioned relative to an inside surface of the drum section to form arcuate spaces between an outside surface of the stator and the inside surface of the drum section; and
   arcuate shaped wedges positioned in the arcuate spaces.

17. A method of utilizing a tensioner for maintaining a predetermined tension on a power transmission belt to be operated on an endless path, the method comprising the steps of providing an arm comprising a belt engaging section and a drum section, providing a support member configured to be secured relative to the belt, the support member comprising a hub having a longitudinal axis and being fixed from movement relative to the belt engaging section, the hub moveably holding the arm, providing a spring operatively interconnected to the arm and the support member, the spring being configured to urge the belt engaging section relative to the support member and against the belt with a force to provide the predetermined tension on the belt, the improvement wherein the method further comprises the steps of:
   providing a stator held by the hub, the stator being positioned relative to an inside surface of the drum section to form arcuate spaces between the outside surface of the stator and the inside surface of the drum section; and
   providing arcuate shaped wedges positioned in the arcuate spaces.

* * * * *